United States Patent Office 3,515,027
Patented June 2, 1970

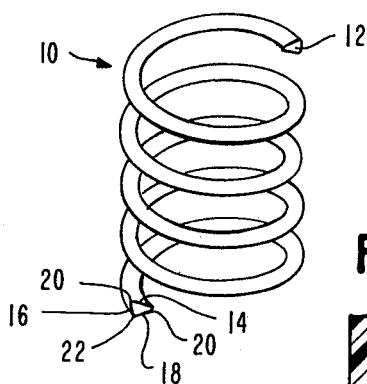
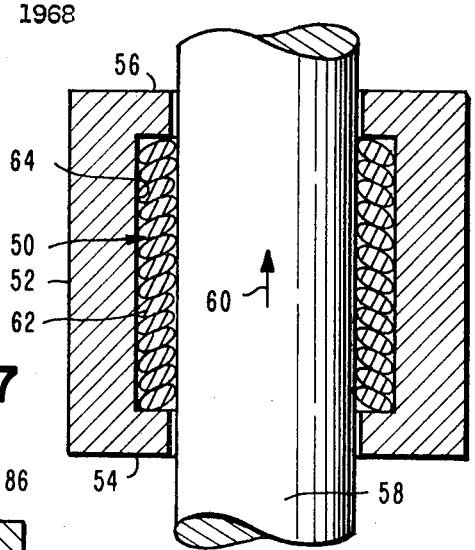
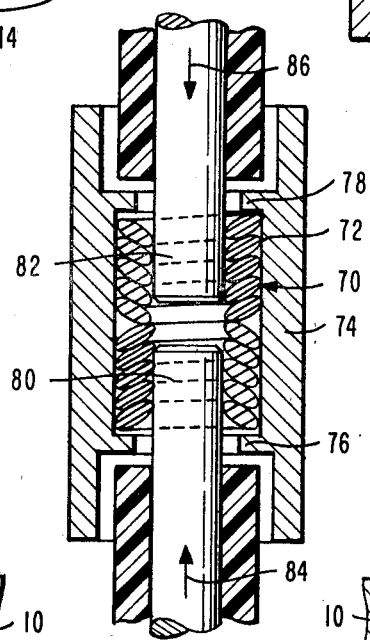
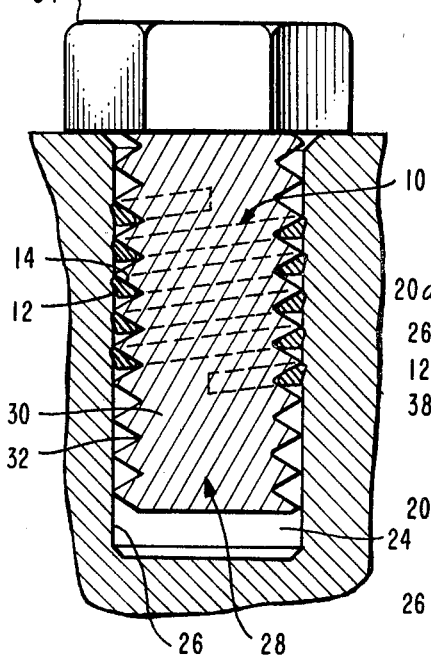
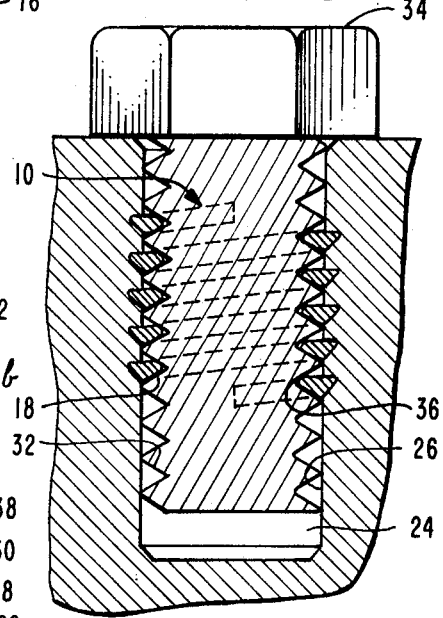
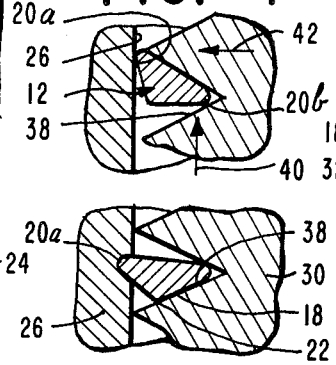
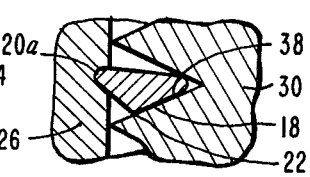

3,515,027
TORSION CAM FASTENER
Ralph Textrom, 104 Bay Ave.,
Newport Beach, Calif. 92661
Filed July 15, 1968, Ser. No. 744,932
Int. Cl. F16b 37/12
U.S. Cl. 85—32                                   1 Claim

ABSTRACT OF THE DISCLOSURE

A fastening means whereby an unthreaded member may be affixed to another unthreaded member or to a threaded member, comprising a helical coil which provides not only the missing set of threads but also locks the fastener in place by a simple turn of one of the fastening members.

---

The present invention relates generally to fasteners and more specifically to fasteners to be used when it is not possible or practical to either tap or thread one or both of the fastener elements. The present invention also relates generally to fasteners of the locking type.

The difficulties of providing threads in some materials have been recognized for some time and various methods have been proposed to solve such difficulties. For example, where it is desired to affixed two articles together and one or both are made of a relatively soft metal such as aluminum, the tapping of a threaded hole will not ordinarily provide a sufficiently firm fastening means. Various proposals have included the use of anchored inserts and the like which have not always proved satisfactory. Similarly, in the harder alloys such as titanium which is difficult to thread, the same problem is presented in attempting to make removable attachments thereto by conventional fastening means. Solutions to such problems have included the use of helical coils designed to engage the threads of the bolt and to embed themselves in the smooth walls of a bore hole in order to provide a substitute for threads. It is evident from such previously known devices, that they do not provide adequate locking means nor do they afford fasteners which can be inserted and removed repeatedly without doing severe damage to one or both of the fastening elements.

The present invention provides a unique solution to the afore-mentioned problems and provides a fastener which locks securely in place and in addition may be removed and replaced repeatedly without doing damage to either of the fastening elements. Where neither fastening element has threads, the invention comprises a helical coil having a constant elliptical cross-section. Where one of the elements is threaded the second embodiment of the invention comprises a constant section helical coil wound to match the threads of any male or female fastener with the cross-section formed substantially in the shape of an isosceles triangle the base of which is greater than the sides. The cross-section of either coil is caused to rotate to increase the lateral interference between the fastener walls. When the fastener about which this second coil is positioned is turned, the cross-section of the coil is caused to rotate by a camming action causing an increased interference between the walls of the bore hole and the shank of the bolt thereby securely locking the fastener in place. The triangular cross-section of the coil provides a stop so that rotation of the cross-section of the coil will not exceed the point at which maximum interference is obtained which could thereby permit the fastener to come loose.

It is the object therefore of the present invention to provide an improved fastening means for instances where it is not possible or practical to provide threads on one or both of the fastening elements.

Further objects and advantages of the present invention will become readily apparent upon reading the following detailed description in conjunction with the drawings in which:

FIG. 1 is a perspective view of the triangular cross-section helical coil made in accordance with the present invention.

FIG. 2 is a sectional elevation showing a threaded bolt in place in a bore hole with the helical member in position but with the fastener in its unlocked position.

FIG. 3 is a sectional elevation of the fastener of FIG. 4 after the bolt has been locked in place.

FIG. 4 is an enlarged detail view showing the position of the triangular coil cross-section when it is unlocked and FIG. 5 is an enlarged detail view showing the relationship of the elements in the locked position.

FIG. 6 is a sectional view of an embodiment where the male and female members are unthreaded.

FIG. 7 is a sectional view showing a pair of male members being inserted in opposite ends of an unthreaded female member.

Turning to FIG. 1, the helical coil 10 is wound having any degree of advance corresponding to the advance for a particular threaded member with which it is designed to cooperate. Thus, for various thread sizes and for various diameters of threaded members, the coil 10 may have slightly different dimensions. What is important is the cross-section of the coil 10. The cross-section 12 of the coil 10 has been altered from the conventional circular cross-section to a substantially triangular one. The cross-section is thus substantially an isosceles triangle with the base 14 greater than the length of either of the sides 16 or 18. The corners 20 which are next adjacent the base 14 are slightly radiused whereas the apex 22 opposite the base is maintained with a relatively sharp angle.

The most frequent use for fasteners of this type may be found in instances where a steel alloy bolt having conventional threads is desired to be fastened into a material of relatively softer alloy in which it is not practical to provide threads. Such a material is demonstrated in FIG. 2 in which a blind bore hole 24 has been provided with the side walls 26 smooth. Although the description of the present invention will be directed towards the use of a bolt 28 in the bore hole 24, it may be understood that various other arrangements of fastening elements may be employed using the same coil 10, whether or not the bolt or the bore hole is threaded and also may include nuts and other types of otherwise conventional fastening elements.

In FIG. 2, a conventional bolt 28 is shown inserted in the bore 24. Prior to insertion of the bolt 28 in the bore 24, the helical coil is wound about the shank 30 of the bolt 28 in such a manner that it resides within the threads 32 thereof. The orientation of the coil 10 is such that the base 14 of the cross-section 12 is oriented away from the direction of insertion of the bolt into the bore hole, or in other words is oriented towards the direction in which it is desired to oppose movement. It is intended to be shown by FIG. 4 that the bolt with the coil 10 in place may be readily inserted into the bore 24 without a great deal of effort since the outer diameter provided by the coil when it is in place is substantially equal to the inside diameter of the bore 24. In the condition shown in FIG. 4, the bolt 28 could be easily withdrawn from the bore 24.

FIG. 3 demonstrates the condition after the bolt 28 has been locked in place. This locking is accomplished by rotating the bolt head 34 in a clockwise direction which causes rotation of the cross-section 12 of the coil 10 changing the lateral dimension of the coil to increase the interference between the trough 36 of the threads 32 and the sidewalls 26 of the bore hole 24. This rotation is affected by the camming action of the threads themselves which force is exerted upwardly on the sides 18 of the coil cross-section.

Reference to FIG. 4 will demonstrate this camming principle. In FIG. 4, the coil cross-section is shown after insertion of the bolt into the bore hole whereby the outer corner 20a will be just in contact with the sidewall 26. As the bolt is rotated clockwise, the thread surface 38 will exert an upward force in the direction of arrow 40 on the corner 20b causing the coil section to rotate anti-clockwise. This will increase the lateral force exerted in the direction of arrow 42 against the sidewalls 26. This increase in force is accomplished as the cross-section rotates anti-clockwise because of the thereby increased lateral dimension of the cross-section.

The disposition of the elements shown in FIG. 5 demonstrates the extreme anti-clockwise rotation of the cross-section 12. Actually, substantial locking of the bolt in the bore hole will be obtained in most cases with a less degree of rotation than shown in FIG. 5. The corner 20a is shown embedded in the wall 26 but in actual situations would probably not be embedded to the degree shown in FIG. 5 except in very soft materials. What is important in FIG. 5 is the stop established by the cross-section 12 when anti-clockwise rotation becomes excessive. At this point, side 18 has come into contact with the flat surface 38 of the thread and the apex 22 of the triangle is likewise in contact with surface 38. The result is that further camming action will not occur. The optimum locking configuration is the point at which maximum interference is made between the sidewalls 26 and the shank 30 of the bolt and this is reached at the point when the base 14 of the coil is rotated to a substantially horizontal position. Were it not for the apex 22 forming a stop against excessive rotation, it is likely that further twisting of the bolt could cause the coil cross-section 12 to rotate past the horizontal position thereby decreasing the locking effect and permitting the bolt to be easily extracted from the bore hole. Where locking is accomplished by rotation of the cross-section to a degree less than the stop position, it will be noted that any effort made to extract the bolt from the hole will increase the locking interference unless the lock is first released by turning the bolt anti-clockwise.

Thus, it will be seen that this embodiment of the present invention has provided a new fastening means for instances where the formation of threads on both the male and female member is not satisfactory or not practical but which provides a threaded fastener with the added feature of a locking facility. One of the unique features of this locking facility is the principle of a stop on this lock to assure that the maximum locking position is not exceeded.

FIG. 6 shows a second embodiment of the present invention for use where both the male and female members are unthreaded. In this instance the helical coil 50 has an elliptical cross-section the major axis of which is turned at an acute angle of about 30 to 45 degrees from the horizontal and the coil 50 is confined within the nut 52 by annular walls 54 and 56. When the male fastening member 58 is inserted within the nut 52, in the direction of the arrow 60, it will slide easily therein with the outer surfaces thereof sliding along the inner edges of the coil 50. The inner dimension of the coil 50 and the outer surface dimensions of the male member 58 are such that substantial sliding friction will be set up between the coil and the member 58 but because of the orientation of the cross-section 62 of coil 50, there will be a greater coefficient of firction encountered for movement of the member 58 in the direction opposite to that of arrow 60. Thus, when the member 58 is caused to be moved in a direction opposite arrow 60, it will tend to cause the cross-section 62 of coil 52 to rotate thereby causing an increase in the interference between the outer surface of the member 58 and the inner surface 64 of the nut. Since the coil 50 is confined by the annular portions 54 and 56, the coil will not slide about in the nut 52 but will more readily cause the cross-section to rotate. It will thus be seen that for the embodiment shown in FIG. 6 there is again the camming action of the coil cross-section to affect a thread-like fastening.

FIG. 7 shows still another modification of this principle in which the coil 70 is again provided with an elliptical cross-section 72 but in which the orientation of the major axis in the upper one-half of the coil is turned approximately 90 degrees from the orientation of the cross-section in the lower one-half of the coil. The entire coil 70 is confined by the female member 74 again having annular confining walls 76 and 78 but is adapted to receive two male members 80 and 82 from different directions. Thus, member 80 may be inserted in the direction of the arrow 84 and member 82 may be inserted in the direction of arrow 86 but extraction of either member 80 or 82 is inhibited by the same camming action causing relative rotation of the coil cross-sections, which is similar to that described in connection with FIG. 6. The embodiment shown in FIG. 7 is particularly adaptable for use for electrical connectors whereby the female member 74 with the coil 70 in place can be adapted to receive and fasten together electrical conductors in the form of the male members 80 and 82.

While the invention has been demonstrated with respect to three embodiments, one of which demonstrates its use with respect to a bolt in a blind hole, it will be readily apparent to persons skilled in the art that the application of the principle of a rotating coil cross-section may be applied to other types of fasteners with equal facility.

I claim:
1. In a fastening means the combination of a threaded fastening element, an unthreaded fastening element and a helical coil, said threaded element having V-shaped threads, said coil being cooperatively positioned in the threads of said threaded element and engaging the sides of said unthreaded element, said coil having a substantially triangular cross section, the apex angle of said triangular cross section being non-radiused, the base of said triangular cross section being substantially disposed along the thread flank facing the leading end of said threaded member, one base angle engaging said thread generally adjacent the thread root, the other base angle projecting beyond the thread crest to a diameter approximately equal to that of said unthreaded member, said apex angle being spaced from the thread flank facing away from the leading end, the sides of said triangular section between the apex angle and the base angle affording stop means to limit rotation of said coil cross section.

References Cited

UNITED STATES PATENTS 2,346,051   4/1944   Seamark.
782,349   2/1905   Marshall.
2,503,093   4/1950   Buchanan.

FOREIGN PATENTS 83,693   10/1957   Denmark.

EDWARD C. ALLEN, Primary Examiner

U.S. Cl. X.R.

151—14; 287—83, 115